July 8, 1941.  E. F. FISHER  2,248,665
SLUDGE SEPARATOR
Filed July 16, 1937   2 Sheets-Sheet 1

INVENTOR
Ernest F. Fisher,
BY Raymond Jones
ATTORNEY

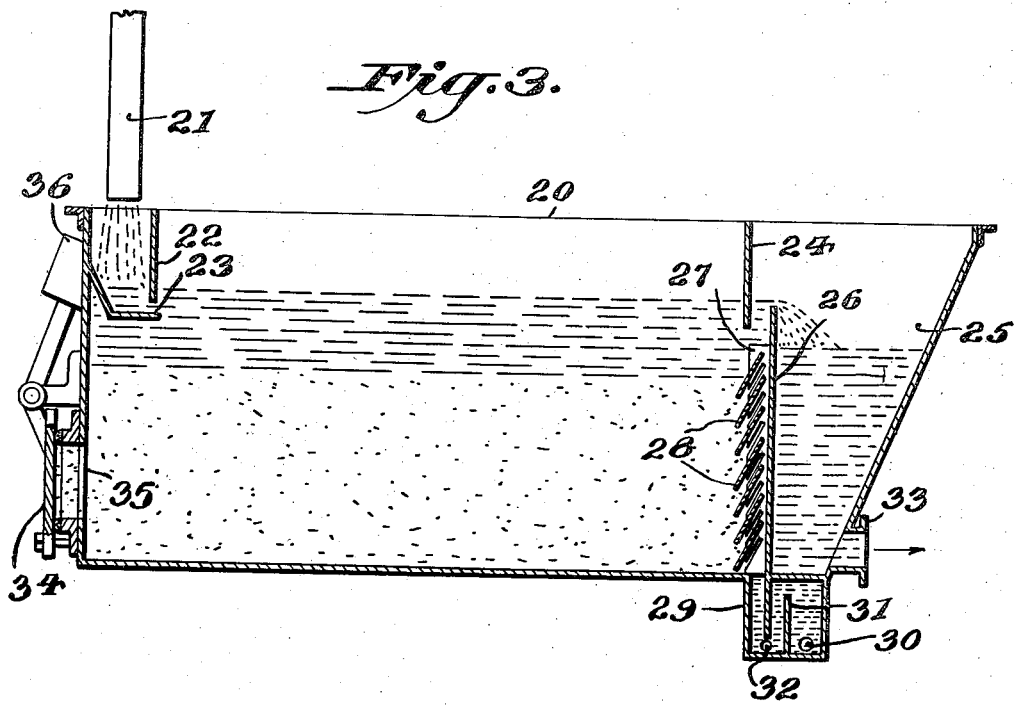
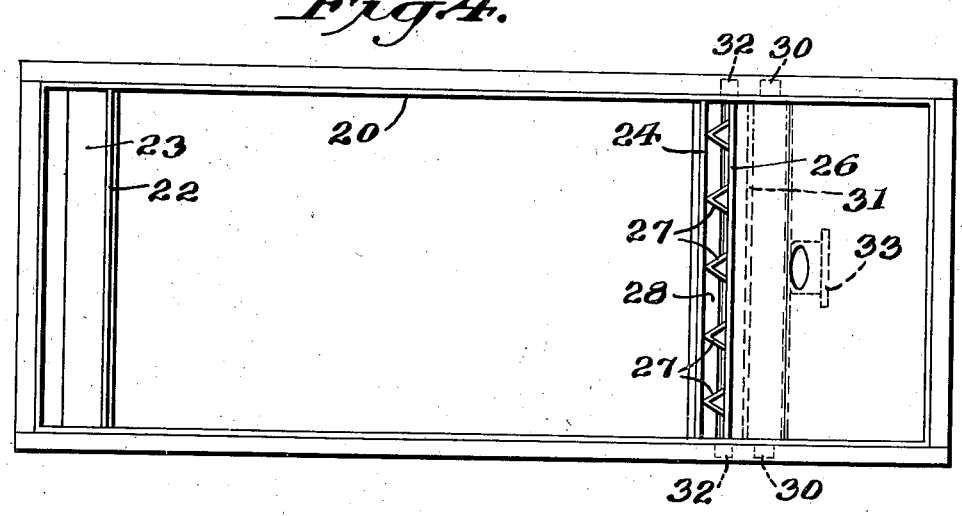

Patented July 8, 1941

2,248,665

UNITED STATES PATENT OFFICE 2,248,665

SLUDGE SEPARATOR

Ernest F. Fisher, Springfield, Ill.

Application July 16, 1937, Serial No. 154,089

7 Claims. (Cl. 210—60)

This invention relates to a sludge separator and, more particularly, to a device adapted to separate water from a sludge which has been formed during the operation of a dust collector system wherein the dust has been removed from air, or the like, by the steps of washing the dust from a volume of air by means of a water spray adapted to entrain the dust particles and form a sludge. In a modified form, the separator is adapted to separate water from a sludge which may be formed from water mixed with dust which has been collected in a dry dust collector system.

The main object of the invention is to provide a sludge separator that is simple in construction, economical to manufacture, and efficient in operation.

Another object is to provide a sludge separator that is adapted to separate water from sludge in an effective manner and in a minimum of time.

A further object is to provide a sludge separator comprising means for readily removing the deposit of heavy sludge or sediment which is formed adjacent the bottom of the separator.

Other objects and advantages will become apparent in the specification which follows and the disclosure of the drawings, wherein—

Fig. 3 is a view, in section, of a modified form of separator; and

Fig. 4 shows a plan view of the separator shown in Fig. 3.

Figure 1:
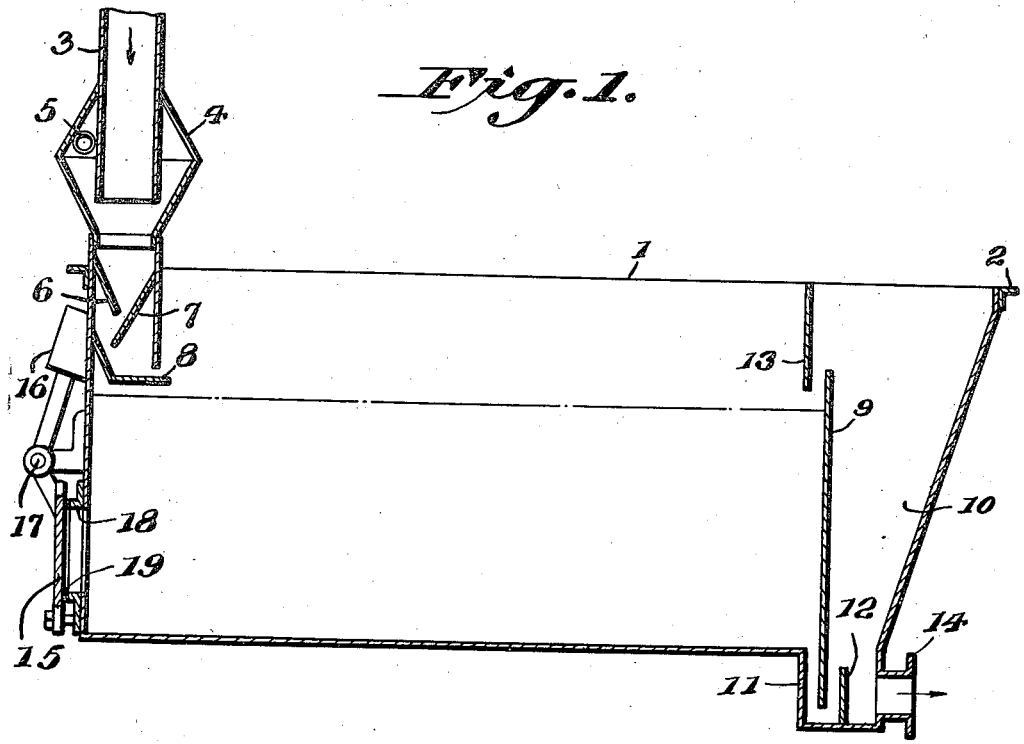
Fig. 1 is a view, in section, of a sludge separator constructed according to my invention.
Figure 2:
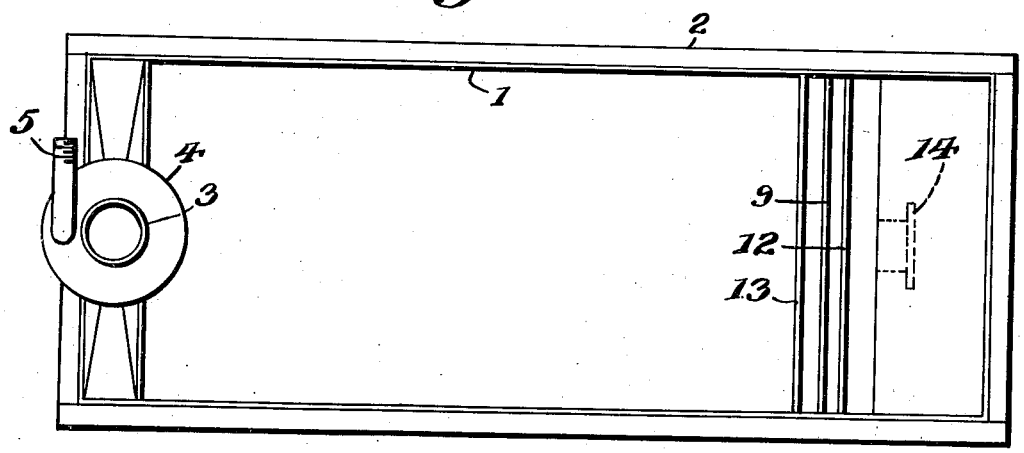
Fig. 2 shows a plan view of the separator shown in Fig. 1.

In Fig. 1, the separator is shown as comprising a rectangular de-watering tank 1 reinforced at its upper edge by a flanged band 2. A conduit 3 which receives its supply of dust from a dry type of dust collector feeds into a mixing chamber 4 into which chamber water is supplied from pipe 5. A series of baffles 6, 7, 8, is provided to facilitate the mixing of water and dust to form a sludge. These baffles preferably extend the full width of the tank 1 to better distribute the sludge within the tank. The heavy portions of the sludge tend to settle towards the bottom of tank 1 while the water separates from the sludge and collects above the heavier sludge level.

A baffle or sludge retaining wier wall 9 is provided to prevent passage of sludge into the clear water chamber 10. The clear water as separated will flow over the upper edge of the baffle 9 and a portion of the entrained water is permitted to seep from the sludge within a sump chamber 11 and pass under the lower edge of the baffle 9. A second baffle 12 is provided to assist in preventing sludge from passing into the chamber 10. A skimmer wall 13 is provided adjacent to the baffle 9 to retard and prevent passage of floating particles into chamber 10.

The clear water which collects in chamber 10 is drawn off from an outlet 14 which leads to a pump provided to recirculate the water back to the water inlet 5 whereby this water may be used again in a continuous cycle to form new portions of sludge in tank 1. A sludge door 15 having a counterweight 16 is hinged at 17 in position to close an opening 18 in the tank 1 placed close to the bottom thereof. A gasket 19 is provided to seal this opening.

In operation, the tank 1 is permitted to fill with sludge the heavy portions of which will settle to the bottom of the tank, while the clear water is permitted to separate from the sludge and pass over and under baffle 9 into the chamber 10. The heavy sludge may be removed when desired through outlet 18. When it is desired to flush the sump 11, water from chamber 10 may be permitted to flow back under baffle 9 to wash out this sump.

In Fig. 3, a tank 20 is supplied with wet sludge from a conduit 21 which leads to a dust collector, and conduit 21 feeds into a water distributing box 22. A baffle 23 aids in distributing the sludge within the tank. A skimmer wall 24 serves to prevent floating particles from passing into the clear water chamber 25. A baffle or wier wall 26 is provided to hold back the sludge and permit water to drain therefrom and pass over the upper edges of this baffle into chamber 25. A series of brackets 27 is provided on wier wall 26 which support a series of inclined baffles 28 of the louvre type. The baffles 28 are spaced from wall 26 and serve to permit water to more readily drain from the sludge and thereafter pass over the top of the baffle 26 into chamber 25. A portion of the sludge collects in a sump 29. The water which is separated from the sludge in sump 29 is permitted to drain off through conduits 30, while a short baffle 31 serves to prevent sludge from passing into conduits 30. Clean-out or flushing conduits 32 are provided to permit flushing of the sump when desired. Clear water may be drawn from chamber 25 through an outlet 33 which is connected to a pump that serves to force this water, if desired, back to the dust collector in a continuous cycle. If desired, conduits 30 and 33 may both be connected to the same pump. A door 34 is arranged to close the sludge removal opening 35 and a counterweight 36 acts to retain this door in its closed position.

In operation, it will be noted that the water which flows over the wier wall 26 is separated from the water which is drained from the sludge in the sump 29 and water from this sump is drained therefrom through a separate conduit. All water separated, however, may be passed to a single pump. The main portion of heavy sludge may be removed through the opening 35 while the sludge in sump 29 may be flushed therefrom by means of water fed in from conduits 32 which may be connected to the pump described.

What I claim is:

1. A sludge separator comprising a tank provided with an inlet for sludge and an outlet for clear liquid, one end of said tank being provided with a clean-out opening adjacent the bottom of said tank, the other end of said tank being provided with a downwardly extending offset chamber forming a sump chamber, a vertically arranged wier wall within said tank and above said sump chamber, dividing the tank into a clear liquid compartment and a sludge compartment, said wier wall being provided on one side with a plurality of spaced parallel louvered baffle plates, said plates extending outwardly and downwardly from said wall and being spaced therefrom at their corresponding edges positioned adjacent said wall.

2. In a separator as set forth in claim 1 wherein the space between the corresponding edges of the said louvered baffled plates and the adjacent wier wall, is above said sump and provides a passageway for water from sludge to drain to said sump.

3. A sludge separator comprising a tank, provided with an inlet for sludge and an outlet for clear liquid, one end of said tank being provided with a clean-cut opening, the other end of said tank being provided with a downwardly extending offset sump chamber, a vertically arranged wier wall within said tank, said wall dividing the tank into a sludge compartment and a clear liquid compartment, said wall extending from a point within said sump chamber spaced above the bottom thereof and upwardly to a point substantially below the top of said tank, an auxiliary baffle wall provided within the sump chamber, said baffle wall extending from the bottom of the sump chamber upwardly beyond the lower edge of the wier wall and displaced laterally therefrom whereby to prevent flow of heavy sludge past the lower edge of said wier wall.

4. A sludge separator comprising a tank, provided with an inlet for sludge and an outlet for clear liquid, one end of said tank being provided with a clean-out opening, the other end of said tank being provided with a downwardly extending offset sump chamber, a vertically arranged wier wall within said tank, said wall dividing the tank into a sludge compartment and a clear liquid compartment, said wall extending from the bottom of the clear liquid compartment and upwardly to a point substantially below the top of said tank, said wier wall provided on one side with a plurality of spaced parallel louvered baffle plates, said plates each extending outwardly and downwardly from said wall and being spaced therefrom at their corresponding edges positioned adjacent said wall.

5. A sludge separator comprising a tank, provided with an inlet for sludge and an outlet for clear liquid, one end of said tank being provided with a clean-out opening, the other end of said tank being provided with a downwardly extending offset sump chamber, a vertically arranged wier wall within said tank, said wall dividing the tank into a sludge compartment and a clear liquid compartment, said wall extending from a point within said sump chamber spaced above the bottom thereof and upwardly to a point substantially below the top of said tank, an auxiliary baffle wall provided within the sump chamber, said baffle wall extending from the bottom of the sump chamber upwardly beyond the lower edge of the wier wall and displaced laterally therefrom, and a vertically arranged skimmer wall positioned within the tank adjacent to but displaced from the wier wall, said skimmer wall extending from a point below the upper edge of the wier wall and upwardly towards the top of the tank.

6. A sludge separator comprising a tank having a liquid containing dust inlet and a clear liquid outlet, one end of said tank being provided with a sump chamber extending downwardly below the bottom of said tank, a wier wall positioned within said tank and extending from a point adjacent to but spaced from the bottom of the sump chamber and upwardly to a point substantially below the top of said tank and dividing the tank to form a large sludge receiving compartment and a smaller clear liquid compartment, a baffle wall in said sump chamber extending from the bottom thereof upwardly beyond the lower edge of the wier wall, and a horizontally arranged partition extending from said wier wall adjacent the lower edge thereof to form a bottom wall for the clear liquid compartment and separate the latter from the sump chamber.

7. In a separator as set forth in claim 6, wherein the sump chamber on one side of the baffle wall is provided with an inlet passage for liquid for flushing out the sump chamber, said sump chamber on the other side of the baffle wall being provided with an outlet to permit egress of liquid from the sump chamber which has flowed under the lower edge of the wier wall and over the upper edge of the baffle wall.

ERNEST F. FISHER.